(12) United States Patent
Lindsay

(10) Patent No.: US 11,164,451 B2
(45) Date of Patent: Nov. 2, 2021

(54) VEHICULAR COMMUNICATION SYSTEM

(71) Applicant: John Lindsay, Dallas, TX (US)

(72) Inventor: John Lindsay, Dallas, TX (US)

(*) Notice: Subject to any disclaimer, the term of this patent is extended or adjusted under 35 U.S.C. 154(b) by 0 days.

(21) Appl. No.: 16/869,641

(22) Filed: May 8, 2020

(65) Prior Publication Data
US 2020/0265712 A1 Aug. 20, 2020

Related U.S. Application Data

(63) Continuation of application No. 16/383,522, filed on Apr. 12, 2019, now Pat. No. 10,657,808, which is a continuation-in-part of application No. 14/710,553, filed on May 12, 2015, now abandoned, which is a continuation of application No. PCT/US2014/030086, filed on Mar. 15, 2014.

(60) Provisional application No. 61/792,148, filed on Mar. 15, 2013, provisional application No. 61/825,068, filed on May 19, 2013.

(51) Int. Cl.
G08G 1/01 (2006.01)
B60Q 1/00 (2006.01)
B60Q 1/44 (2006.01)

(52) U.S. Cl.
CPC ......... *G08G 1/0145* (2013.01); *B60Q 1/0023* (2013.01); *B60Q 1/44* (2013.01); *G08G 1/0112* (2013.01); *G08G 1/0116* (2013.01)

(58) Field of Classification Search
None
See application file for complete search history.

(56) References Cited

U.S. PATENT DOCUMENTS

| 5,446,470 A | 8/1995 | Avignon et al. |
| 6,486,775 B1* | 11/2002 | Lo ............................ B60Q 1/52 340/467 |
| 7,365,769 B1* | 4/2008 | Mager ...................... B60Q 1/44 340/467 |
| 10,657,808 B2* | 5/2020 | Lindsay ............... G08G 1/0112 |
| 2002/0003571 A1* | 1/2002 | Schofield ............ B60R 11/0235 348/148 |
| 2007/0008234 A1 | 1/2007 | Capps et al. |
| 2009/0140921 A1 | 6/2009 | Bongfeldt et al. |
| 2010/0052945 A1 | 3/2010 | Breed |

(Continued)

FOREIGN PATENT DOCUMENTS

| JP | 2002074577 | 3/2002 |
| WO | WO2008118014 | 10/2008 |
| WO | WO2009015202 | 1/2009 |

*Primary Examiner* — David W Lambert
(74) *Attorney, Agent, or Firm* — John Lindsay

(57) ABSTRACT

Exemplary embodiments of the present invention are directed to a system for monitoring, recording, and analyzing driver activity. An exemplary system comprises a sensor module configured to receive data from one or more sensors that measure acceleration or deceleration associated with a vehicle. A stop detection module is configured to receive the sensor module data, process the sensor module data, and determine an abrupt acceleration or deceleration event. A location module is configured to retrieve the location of the vehicle simultaneous with an abrupt acceleration or deceleration event. The system stores the location of the abrupt acceleration or deceleration event in an event record in an event database.

20 Claims, 22 Drawing Sheets

(56) References Cited

U.S. PATENT DOCUMENTS

| | | | |
|---|---|---|---|
| 2012/0062743 A1* | 3/2012 | Lynam | H04N 5/23293 |
| | | | 348/148 |
| 2012/0179350 A1* | 7/2012 | Taneyhill | B60W 10/06 |
| | | | 701/96 |
| 2012/0299373 A1 | 11/2012 | Yoshida | |
| 2015/0153735 A1* | 6/2015 | Clarke | B62D 15/0265 |
| | | | 701/301 |
| 2016/0275329 A1* | 9/2016 | Gussen | G06K 19/06037 |

* cited by examiner

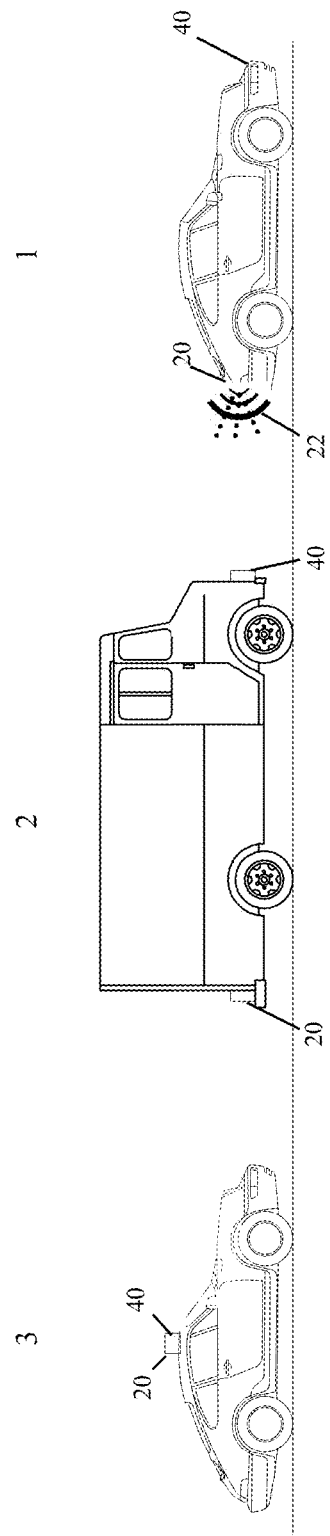

VEHICULAR COMMUNICATION SYSTEM

BACKGROUND

Field of the Invention

The present invention relates to a vehicular system, more specifically to a vehicular communication system.

Description of the Related Art

For certain driving conditions, communications from one vehicle to a subset of other proximate vehicles is desirable. In a braking situation, reaction time is one of the most significant factors in causes of rear-end vehicular collisions. Driver reaction times are greatly affected by whether the driver is alerted to the need to brake. In a representative problem scenario illustrated in FIG. 15A, there is a leading vehicle 1, a first trailing vehicle 2, and a second trailing vehicle 3. When the leading vehicle 1 directly ahead of the first trailing vehicle 2 stops, the driver of the first trailing 2 vehicle is alert, visual conditions are excellent, and the driver notices the brake signal or turn signal of the leading vehicle 1, the best possible reaction time is achieved. However, where the second trailing vehicle 3 is further behind and obscured by the first trailing vehicle 2, the driver of that second trailing vehicle 3 is unable to see the braking or other signal lights of that leading vehicle 1. That driver must rely on the reaction time and driving style of the vehicles between him and the leading vehicle 1 and rely on the driver of the intervening first trailing vehicle 2 in order to maximize reaction time and apply the brakes at the earliest possible opportunity.

In such cases, the driver loses valuable time needed to interpret the event, decide upon the response, and then apply brakes, steer, or other suitable response. To a great extent, available reaction time depends on the distance of the lead vehicle 1 to the trailing vehicles 2 3 when it activates its signal light. Differences in drivers' attention and reaction time in tenths of a second or lower can limit accidents and decrease high stress driving. These problems are exaggerated in congestion zones or peak driving times, leading to frequent hard stopping, frequent acceleration, and a poor driving experience.

SUMMARY

Exemplary embodiments of the present invention are directed to a system for monitoring, recording, and analyzing driver activity. An exemplary system comprises a sensor module configured to receive data from one or more sensors that measure acceleration or deceleration associated with a vehicle. A stop detection module is configured to receive the sensor module data, process the sensor module data, and determine an abrupt acceleration or deceleration event. A location module is configured to retrieve the location of the vehicle simultaneous with an abrupt acceleration or deceleration event. The system stores the location of the abrupt acceleration or deceleration event in an event record in an event database.

These and other features, aspects, and advantages of the invention will become better understood with reference to the following description, appended claims, and accompanying drawings.

BRIEF DESCRIPTION OF THE DRAWINGS

FIGS. 5a-5c illustrate side views of embodiments of the system as they may exist in operation;

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Figure 1:
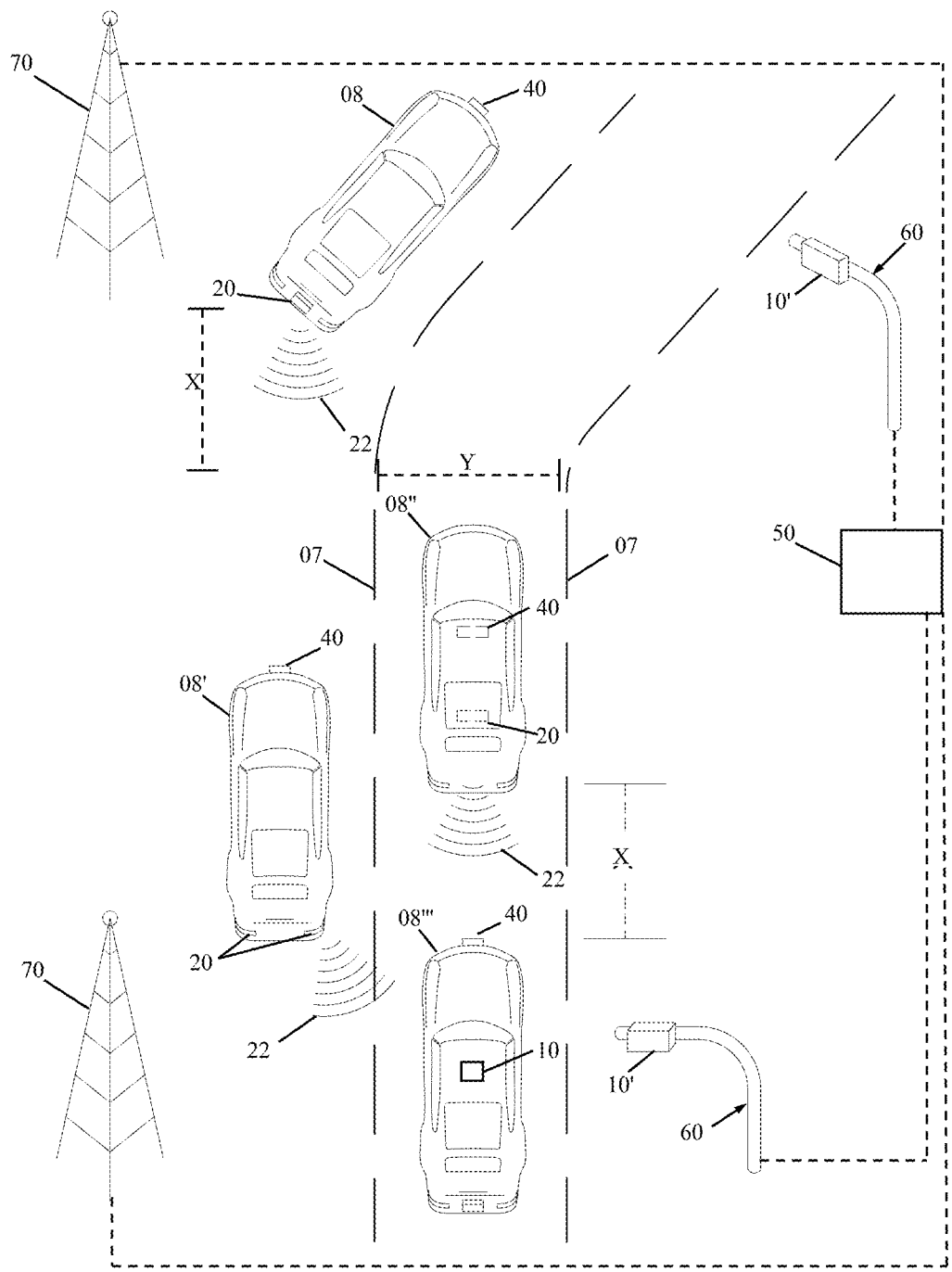
FIG. 1 illustrates a top view of embodiments of the invention as it may exist in operation.

The current invention relates to a device for directed vehicle to vehicle communication. A representative scenario is relaying a vehicle's signal condition to trailing vehicles in the same lane. FIG. 1 illustrates a plurality of vehicles 08 equipped with vehicle to vehicle communication systems 10 (shown separately in FIG. 3) as they may exist in operation. The vehicle to vehicle communication system 10 includes an emitter 20 and a receiver 40 for attachment to a single vehicle 08. As shown, the emitter 20 and receiver 40 can be configured for different spatial placement on a vehicle 08. They can be housed in a single unit 08''' for attachment to the vehicle ceiling or roof. The system 10 can be configured for receiver 40 placement on the front of the vehicle 08 08' or toward the front of the vehicle 08''. The vehicle to vehicle communication system 10 can be configured for emitter 20 placement on the rear of the vehicle 08 08' or toward the rear of the vehicle 08''.

Figure 2:
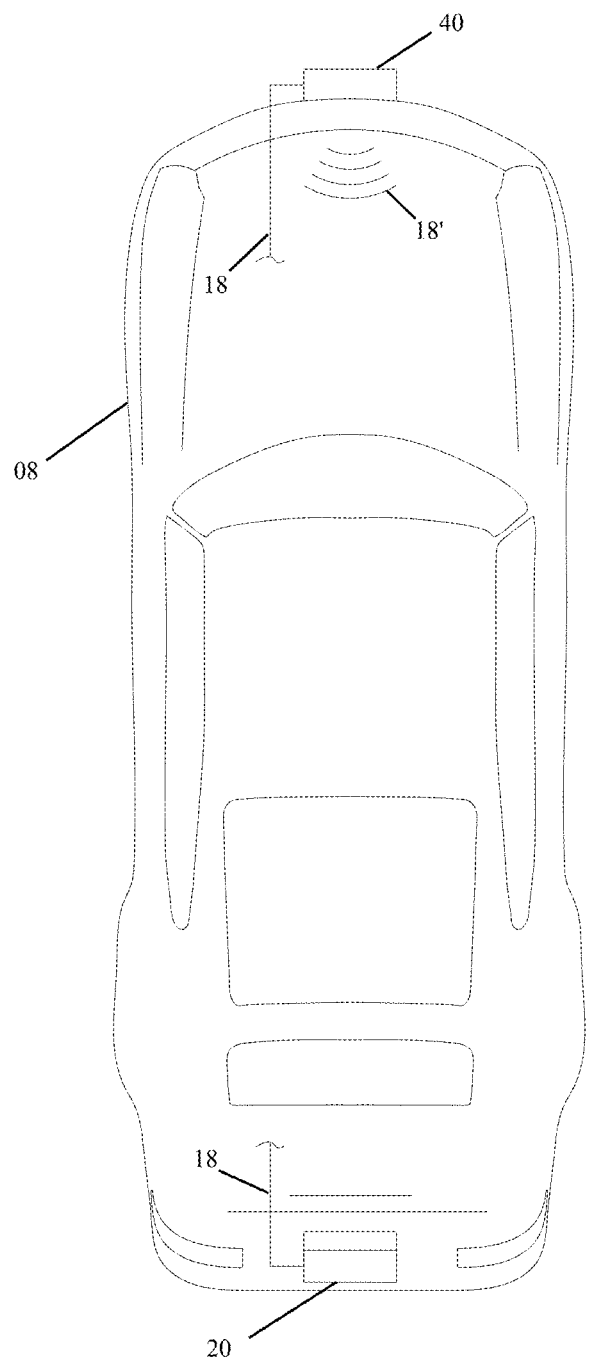
FIG. 2 illustrates a top view of an embodiment of the invention as it may exist in operation.
Figure 3:
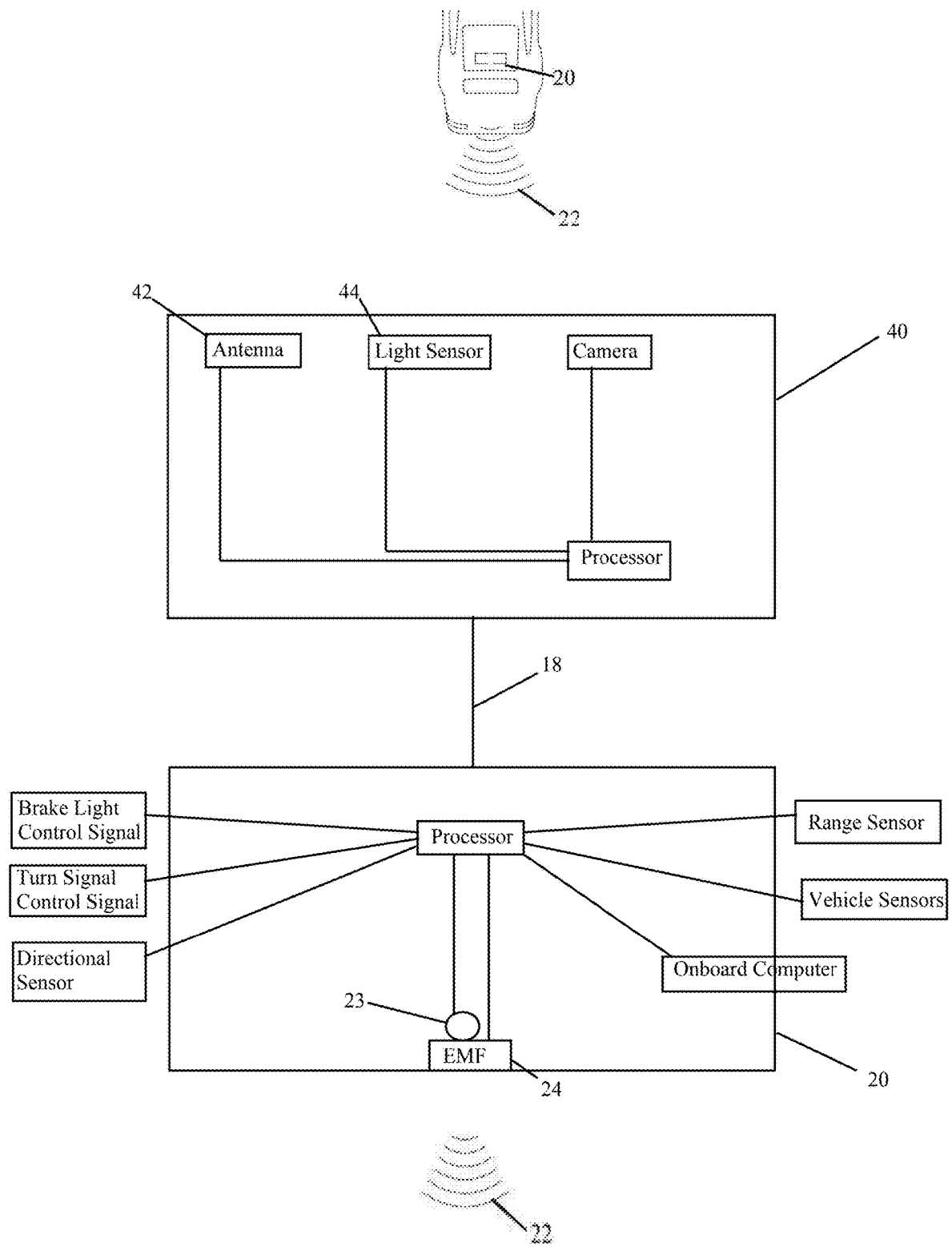
FIG. 3 illustrates a block diagram of the embodiment illustrated in FIG. 1.

FIG. 2 illustrates an embodiment of the vehicle to vehicle communication system 10 deployed to a vehicle 08. Depicted is an emitter 20 in communication with a receiver 40. FIG. 3 illustrates a block diagram of the embodiment of FIG. 2. The emitter 20 is operable to signal in response to threshold signal input to the receiver 40 or a signal use condition of the subject vehicle. A signal use condition is one in which a signal light is in use or its use is warranted. Exemplary signal use conditions include brake signal use or turn signal use. For example, a switch may be mounted inline with the signal for the brake light or turn signal in the vehicle. In an automated driving system, a control signal for a brake light or turn signal activation can be monitored. Alternatively, the emitter 20 can employ sensors to detect the use condition. In such a configuration, the emitter 20 can include a light sensor mounted proximate the signal light of the vehicle 08. When a driver of the vehicle 08 depresses the brake pedal or uses the turn signal switch, the vehicle 08 activates the corresponding signal light. The emitter 20 detects the control signal or the light therefrom. Another example signal condition is a road hazard such as a pothole.

In one configuration, the emitter 20 includes a configured visual signal. The exemplary signal is one which is different than current brake signals. Representative visual signals include selected shapes, colors, brightness, flashing sequences, unique indicia, or the like.

In an alternate configuration, the emitter 20 contains an electromagnetic radiation source 24, configured to transmit a directional beam 22 from the vehicle 08. In one configuration, the electromagnetic radiation source 24 includes a coherent light source such as a laser. In an alternate configuration, the electromagnetic radiation source 24 includes a light source such as a filament or LED. In yet another configuration, the electromagnetic radiation source 24 includes a radio wave source.

In exemplary configuration, to the extent that the electromagnetic radiation source 24 permits, the beam 22 width is transmitted such that it has less than a configured signal strength outside a configured width y and less than a configured signal strength at a pre-configured distance x for a given set of environmental conditions. In exemplary operation, the beam 22 width is less than about one traffic lane wide at distance x or has a lower signal strength outside the configured width. Beam 22 width is controlled using processes known in the art. In certain configurations, a laser is included. In other configurations, an LED or filament coupled with a lens is included. Radio frequency is controlled by using reflectors, antennae arrays, apertures, and/or specific wavelengths in order to control beam 22 width.

It is within the scope of this invention to vary the signal strength of the beam 22. For example, the signal strength can be altered in response to rain, fog, or other conditions which alter signal transmission. It is also within the scope of the invention to incorporate multiple electromagnetic radiation sources 24. In certain configurations, the emitter 20 energizes one or more of the electromagnetic radiation sources 24 during operation. For example, the emitter 20 can include both a light source and a radio frequency source and transmit radio frequency where light transmission may be suboptimal.

In exemplary configuration, to the extent that the electromagnetic radiation source 24 permits, the beam 22 width is configured to have configured signal strength or range of signal strength in order to have less than a configured signal strength at a pre-configured distance x for a given set of environmental conditions. For example, the beam 22 can be configured with a transmission strength such that the beam 22 signal strength is approximately zero or below a threshold signal strength at distance x. Alternatively, the beam 22 may be configured for transmission where the beam 22 signal strength is a known amount at distance x for given conditions. In certain configurations, the beam 22 transmission strength is adjusted based on input for environmental conditions which would affect transmission distance. For example, a humidity sensor can provide input for rain or fog conditions that could impede light or radio wave transmission.

Optionally, the emitter 20 is configured to direct the beam 22 in response to turning conditions of the vehicle. The emitter 20 can receive steering wheel use, position data, accelerometer, global positioning system (GPS) data, or other similar sensing to detect a turn condition. In response, the emitter 20 employs a beam director 23 to alter the beam 22 direction proportionate to the turn angle of the vehicle, as shown in vehicle 08. In an alternate configuration, the emitter 20 is deactivated during a turn condition.

In certain embodiments, the emitter 20 encodes data into the beam 22. One such data element that the beam 22 can incorporate is relay count data, which facilitates peer to peer, vehicle to vehicle network type communication. That is to say a "chain" of vehicles relay data as nodes. Relay count data facilitates configurable conditional signal transmission through the vehicular chain. A base relay count can be provided by the receiver 40, as will be disclosed below. Relayed data through the vehicular chain is variable. For example, a total relay count is the number of vehicles that have relayed a signal (ie a "hop count"). In such a situation, the emitter 20 can increment the received active relay count data prior to encoding for transmission to trailing vehicles. An active relay count is the instantaneous number of signal use conditions, such as activated vehicle signals, within range of one or more vehicle to vehicle communication systems 10 in the chain. In exemplary usage scenarios, active relay count is the number of vehicles in the same lane in front of the subject vehicle with activated vehicle signal lights, such as applying brakes or turn signals.

In certain configurations, other data is encoded in the beam 22, such as a car identifier, accelerometer data, velocity data, directional data, GPS data, lane indication data, other data from the subject vehicle, other vehicle(s) signal relay systems 10 data, or derived data can be encoded within the beam 22. The received data for encoding can include sources from the vehicle computer, sensors, portable computers of a vehicle occupant, or other vehicle to vehicle communication systems 10. For example, the beam 22 can incorporate inter-vehicle distance data, such as that between the leading vehicle and the subject vehicle from a range sensor system. Moreover, the vehicle to vehicle communication systems 10 can process the data prior to encoding. To illustrate, the emitter 20 can accumulate the distance data of leading vehicles and add distance between the subject vehicle and leading vehicle for encoding and transmission.

Referring to FIG. 3, the emitter 20 is in communication with the receiver 40 via a cable 18 or wirelessly 18'. In certain configurations, the receiver 40 is operable to monitor, receive, and decode beams of the emitters 20 of similarly configured vehicle to vehicle communication systems 10 of other vehicles. During monitoring, the receiver 40 monitors receipt of a beam 22 at an antenna 44 or light sensor 42. Upon receipt of a beam 22, the receiver 40 optionally determines signal strength. Where the signal strength of the beam 22 is lower than a pre-determined threshold, the receiver 40 may cease further signal or relay processing steps.

The receiver 40 decodes the data of the beam 22 of a leading vehicle, including the relay count and other data. The decoded data is stored for retrieval and use by the emitter 20, the notification system of the vehicle 08, vehicle computer, or other systems. In one configuration, the receiver 40 signals the notification system of the vehicle 08, where the notification system activates a signal to alert the driver of the subject vehicle via a dash indicator or window display, optionally signaling the active relay count. In yet another configuration, the receiver 40 conditionally transmits a notification or beam data when the relay count is less than a pre-configured threshold. In another configuration, the receiver 40 transmits the decoded data to a display or vehicle computer. In yet another configuration, the receiver 40, outputs a control signal for an automated vehicle control system input. In another configuration, the receiver 40 communicates the active relay count and other data to the emitter 20, optionally incrementing the relay count. When beam 22 transmission and receipt terminates or is below the threshold, receiver 40 post-beam processing activity terminates. The receiver 40 then can indicate a non-signal or below threshold state.

Figure 4:
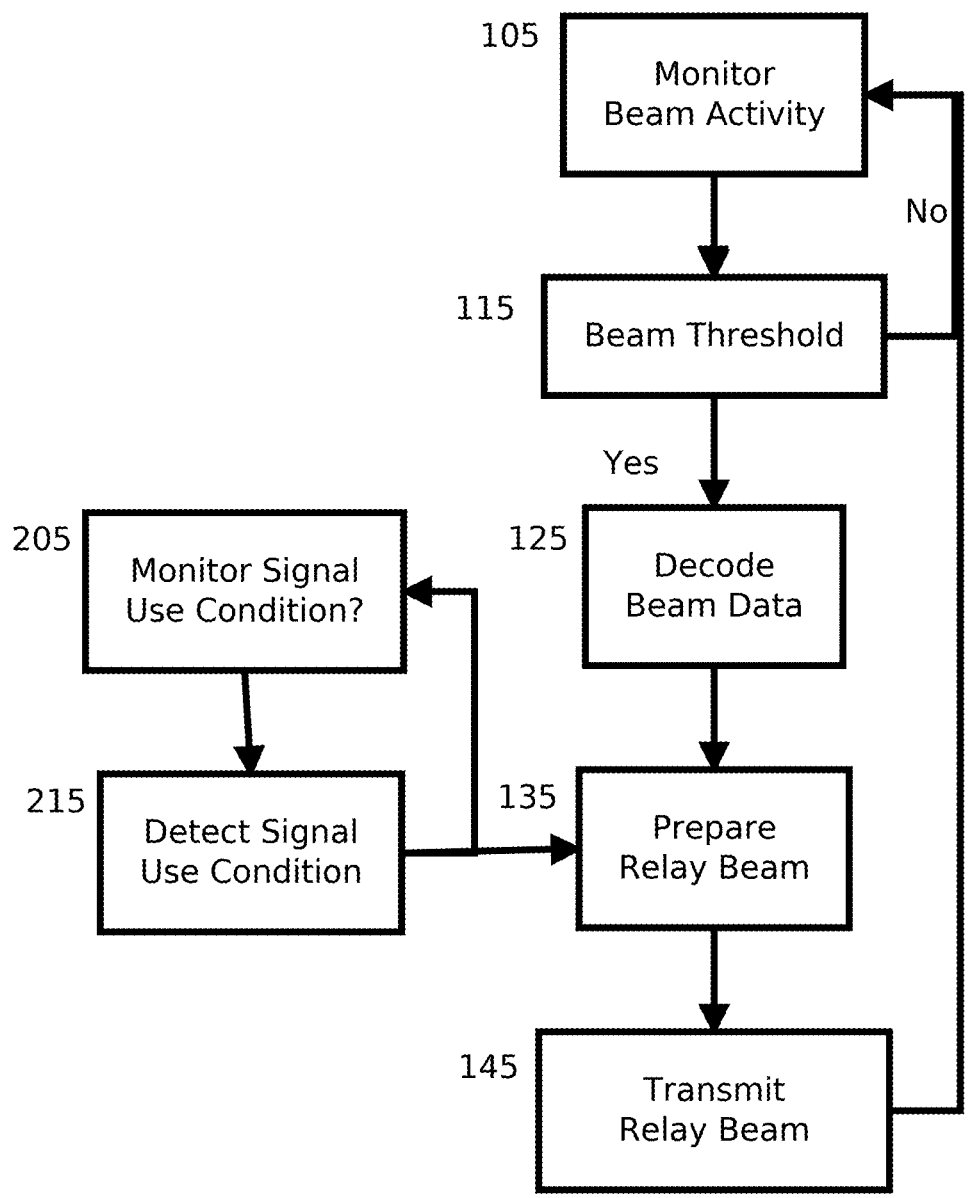
FIG. 4 illustrates an embodiment of a process implemented to the system of FIG. 1.
Figure 5A:
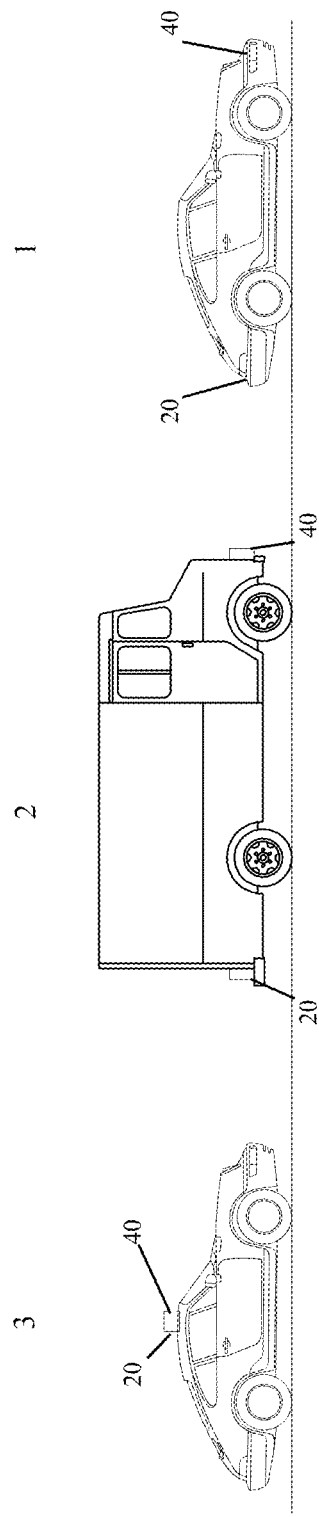

Having described elements of the vehicle to vehicle communication system 10, representative methods of operation are disclosed. FIG. 5a depicts a leading vehicle 1, a first trailing vehicle 2, and a second trailing vehicle 3, driving in a lane in sequence and each equipped with a vehicle to vehicle communication system 10. FIG. 4 depicts a process of an embodiment of the vehicle to vehicle communication system 10 in operation.

A leading vehicle's 1 vehicle to vehicle communication system 10 monitors for a signal use condition of the vehicle 1 205. Upon detection of a signal use condition 215, the vehicle to vehicle communication system 10 prepares a beam and transmits a beam for transmission 135 145. FIG. 5b illustrates the leading vehicle 1 with an activated brake signal and a simultaneous beam 22 of pre-configured width and signal strength. Below is the state of leading vehicle 1 in a braking signal use condition and its vehicle to vehicle communication system 10.

| Signal Use Condition | Signal Activated? | Beam Activated? | Total Relay Count | Active Relay Count | Leading Vehicle Signaling? |
|---|---|---|---|---|---|
| True | Brake | True | 0 | 0 | n/a |

Figure 5C:
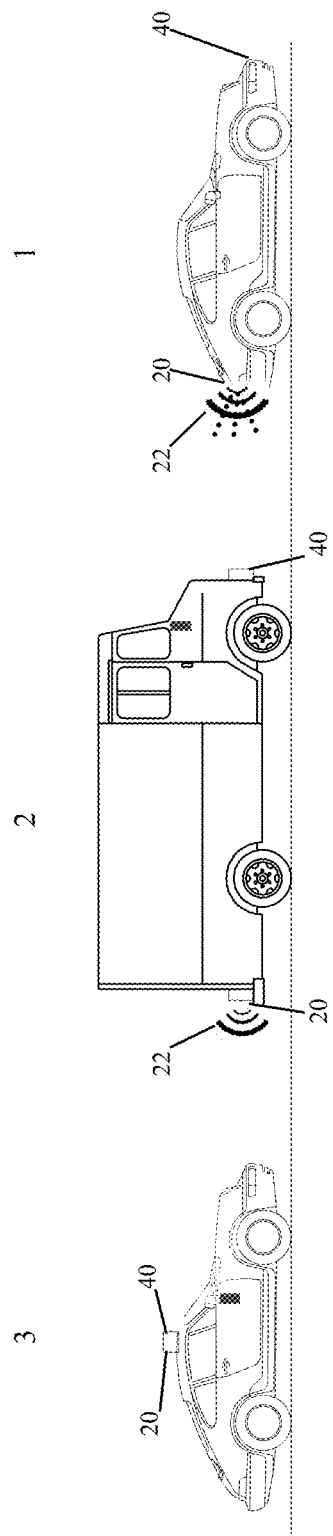

The receiver 40 of first trailing vehicle 2 monitors for beam 22 activity from leading vehicles 1 equipped with similarly configured vehicle to vehicle communication systems 105. As described above, a signal use condition of a brake light and beam 22 of pre-configured width and signal strength is activated from the leading vehicle 1. Beam 22 is received by the first trailing vehicle 2 and the receiver 40 determines whether the beam 22 signal strength threshold is reached 115. If the beam 22 signal strength threshold is reached, the beam 22 data is decoded, displayed, and/or communicated to the emitter 125. In one configuration, the emitter 20 of the subject vehicle 2 activates its visual signal in response. The emitter 20 prepares beam data 135, retrieving and processing the necessary data. It increments the total relay count, conditionally incrementing active relay count with input from the receiver 205 215, retrieves the car identifier, and appends other data for encoding. The encoded beam 22 is transmitted 145. As illustrated in FIG. 5c, notifications of the brake light signal use condition of the leading vehicle 1 is shown in the trailing vehicles 2 3. Below is the state of first trailing vehicle 2 and its vehicle to vehicle communication system 10.

| Signal Use Condition | Signal Activated? | Beam Activated? | Total Relay Count | Active Relay Count | Leading Vehicle Signaling? |
|---|---|---|---|---|---|
| False | False | True | 1 | 1 | True |

The receiver 40 of second trailing vehicle 2 monitors for beam 22 activity from leading vehicles, in this scenario vehicle 2, equipped with similarly configured vehicle to vehicle communication systems 105. As described above, a signal use condition of a brake light and beam 22 of pre-configured width and signal strength is activated from the leading vehicle 1 and first trailing vehicle 2 transmits a relay signal 22 of the leading vehicle 1 signal use condition. Beam 22 is received by the second trailing vehicle 3 and the receiver 40 determines whether the beam 22 signal strength threshold is reached 115. The beam 22 data is decoded, displayed, and/or communicated to the emitter 125. In this scenario, the vehicle to vehicle communication system 10 is configured to only transmit relay beams 22 where the total relay count is less than or equal to one, thus it does not prepare beam data or transmit a beam 22. Below is the state of second trailing vehicle 3 and its vehicle to vehicle communication system 10.

| Signal Use Condition | Signal Activated? | Beam Activated? | Total Relay Count | Active Relay Count | Leading Vehicle Signaling? |
|---|---|---|---|---|---|
| False | False | False | 2 | 1 | True |

Figure 6:
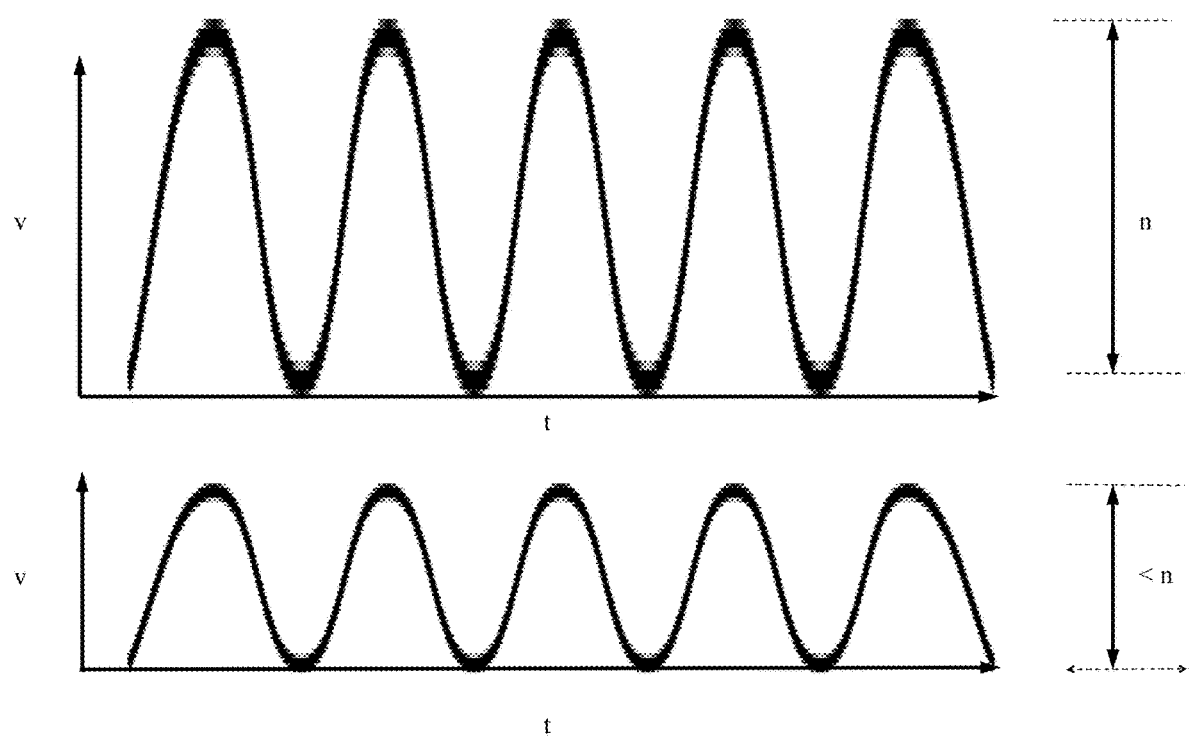
FIG. 6 illustrates traffic analysis module aggregate traffic data and suggested traffic signals.
Figure 7A:
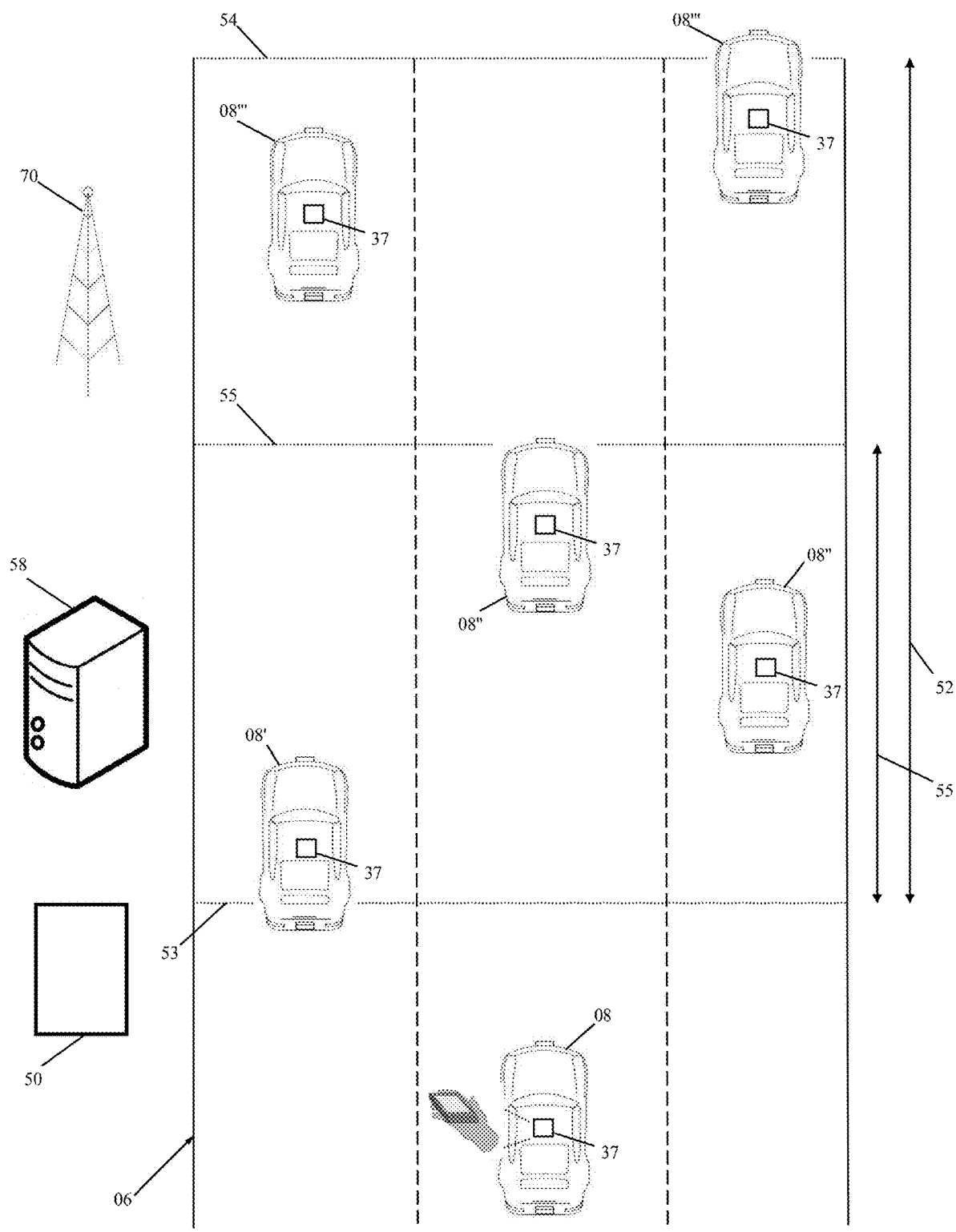
FIGS. 7a and 7b illustrate top view diagrams of embodiments of traffic analysis module systems as they may exist in operation.
Figure 7B:
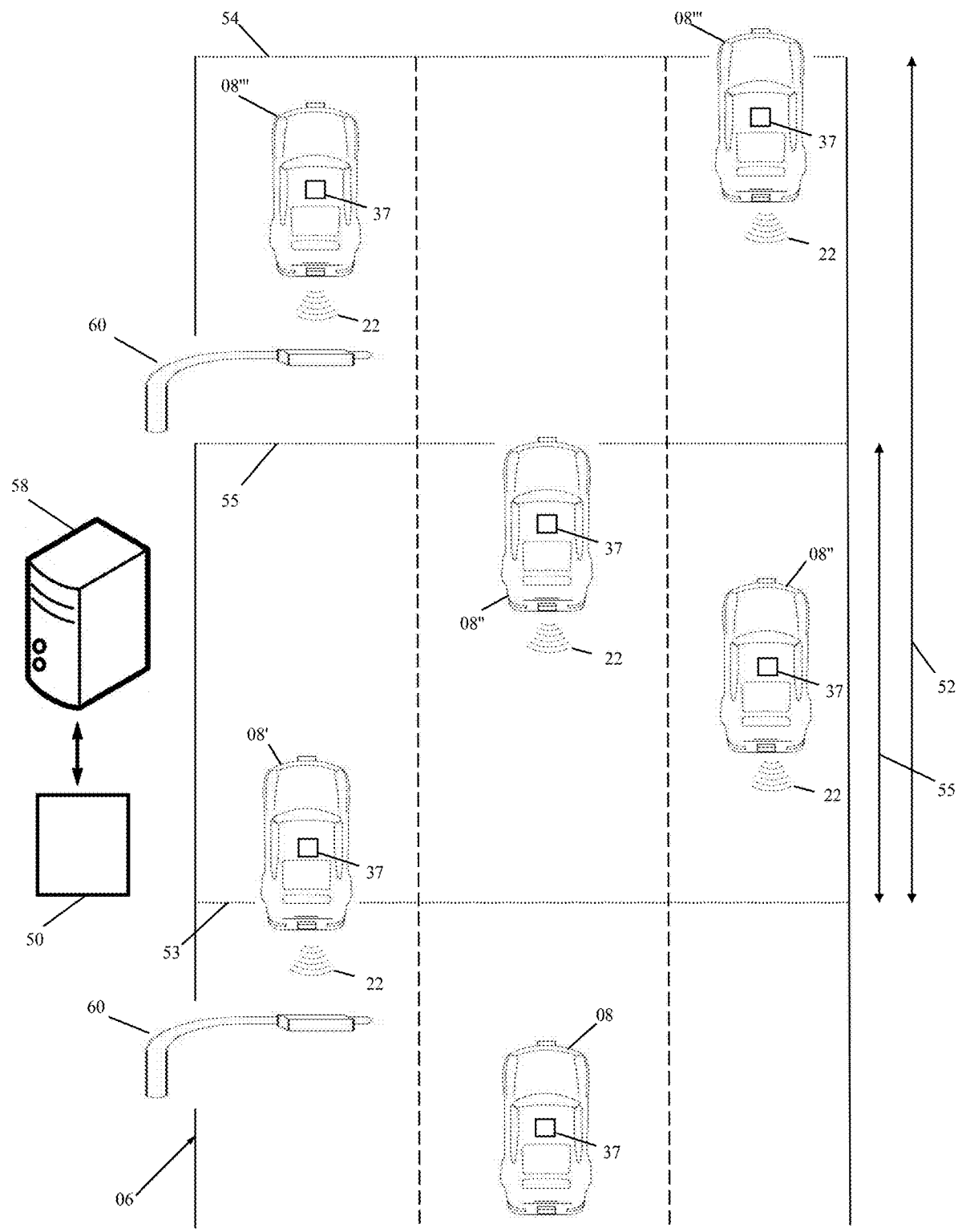
Figure 8:
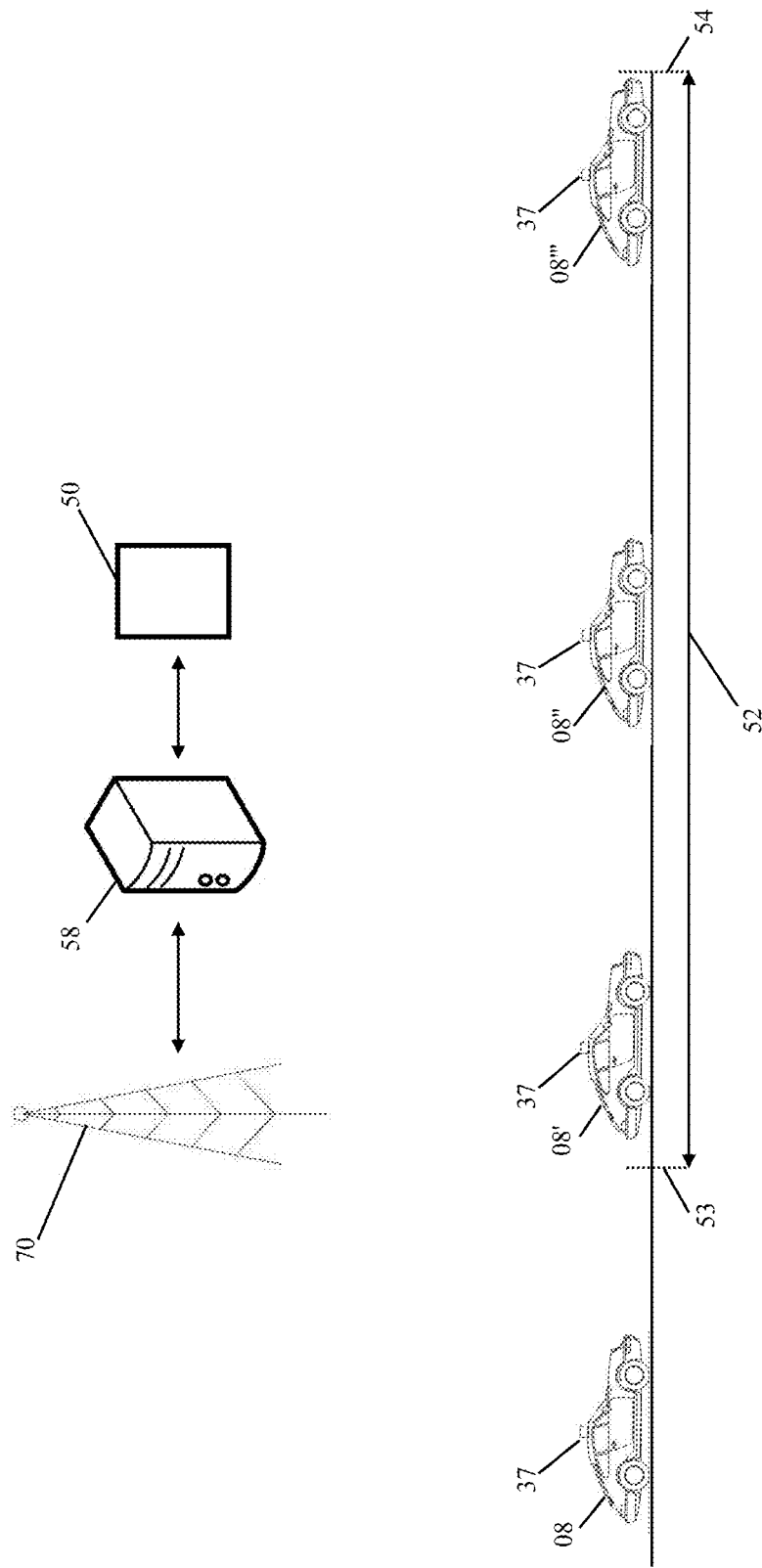
FIG. 8 illustrates a side view diagram of an embodiment of a traffic analysis module system as it may exist in operation.
Figure 9:
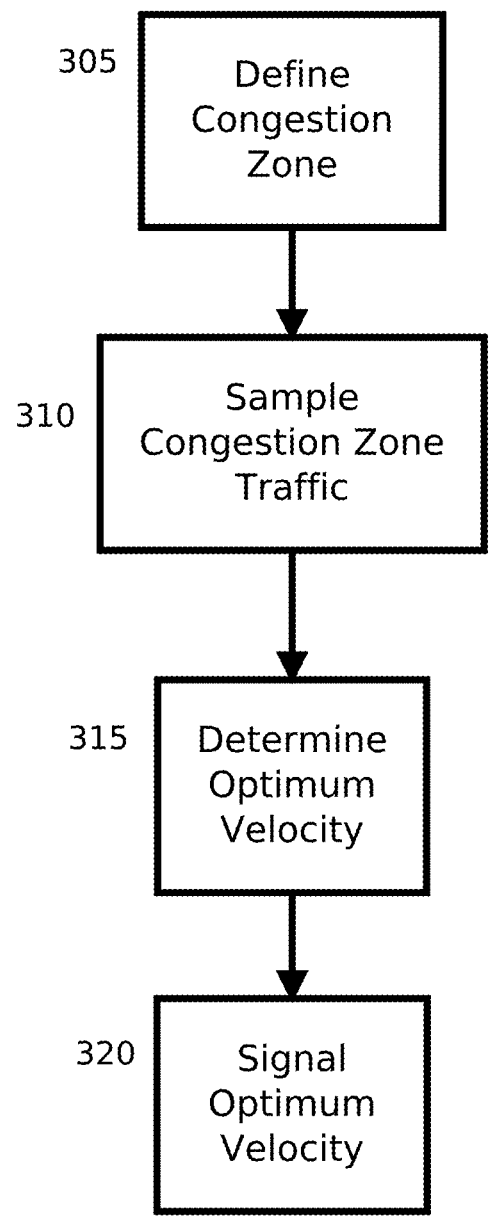
FIG. 9 illustrates an embodiment of a process of traffic analysis.

Now referring to FIGS. 1 and 6, in an alternate embodiment, the invention further includes a traffic analysis module 50 for traffic analysis of a plurality of vehicles 08 equipped with vehicle to vehicle communication systems 10 in a traffic zone. In exemplary operation, the traffic analysis module 50 conditionally transmits instructions in response to the traffic analysis. The traffic analysis module 50 includes a processor and memory. The traffic analysis module 50 defines one or more traffic zones to be monitored, a zone through which a plurality of vehicles 10 equipped with vehicle to vehicle communication systems 10 may pass. The traffic analysis module 50 receives beam 22 data from the vehicle to vehicle communication systems 10 of the vehicles or other sources. It should be appreciated that this communication may be in-band or out-of-band with the beam data 22 communications disclosed above. The traffic analysis module 50 associates position data with a particular vehicle 08 in order to confirm presence in the traffic zone. Optionally, the traffic analysis module 50 determines a position or relative position of a particular vehicle within the traffic zone.

Referring to FIG. 1, in one configuration, the traffic analysis module is in communication with at least one tower 60, and in exemplary configuration, a plurality of towers 60 in communication with each other and disposed at known locations within and adjacent the traffic zone. The exemplary tower 60 includes a traffic module receiver 40' and traffic module emitter 20' similar to those disclosed above. The receiver 40' and emitter 20' are preferably mounted above the vehicle heights for improved beam 22 reception by line of sight to plural vehicles. Optional configurations of the signal use emitter 20' include widened beam 22 width and increased signal transmission strength for multi-vehicle transmissions. In alternate configurations, the position data of a particular vehicle to vehicle communication system 10 is based on an associated GPS, an associated portable computer, an associated portable phone and cell phone tower 70, or similar systems.

The traffic analysis module 50 processes received vehicular signal system 10 data for suboptimal traffic conditions, such as frequent sharp velocity changes or frequent signal use conditions. The module 50 may receive beam 22 data of a single vehicle 08, a sample of vehicles 08, or larger data set(s) of vehicles 08 within the traffic zone for analysis. In one configuration, the traffic analysis module 50 processes the velocity of the vehicles in the traffic zone and calculates peak to trough variations n over time, a representation of which is shown in the upper graph of FIG. 6. In an alternate configuration, the traffic analysis module 50 processes the number of active signal conditions over time. To illustrate, the module 50 may use the number of active brake lights per second within the traffic zone.

The traffic analysis module 50 optionally determines suggested instructions for optimizing traffic within the traffic zone, vehicles at the perimeter of the traffic zone, vehicles just adjacent and entering the traffic zone, or traffic control signals in or adjacent the traffic zone. The instructions correlate to the method employed to determine the suboptimal traffic condition. For example, in the disclosed peak to trough velocity analysis, the traffic analysis module may send suggested deceleration signals in order to decrease the peak to trough velocity and "flatten the curve," as shown in the bottom graph of FIG. 6. In the disclosed simultaneous active signal process, the module 50 can also suggest deceleration signals. The method of communicating the suggested instructions varies. Representative methods includes a visual signal proximate the tower 60, a signal from the emitter 40' of the tower 60 to subject vehicles, a message to a portable computer associated with the vehicle, a message from the cell phone tower 70 to a phone associated with the vehicle, or the like.

Figure 10:
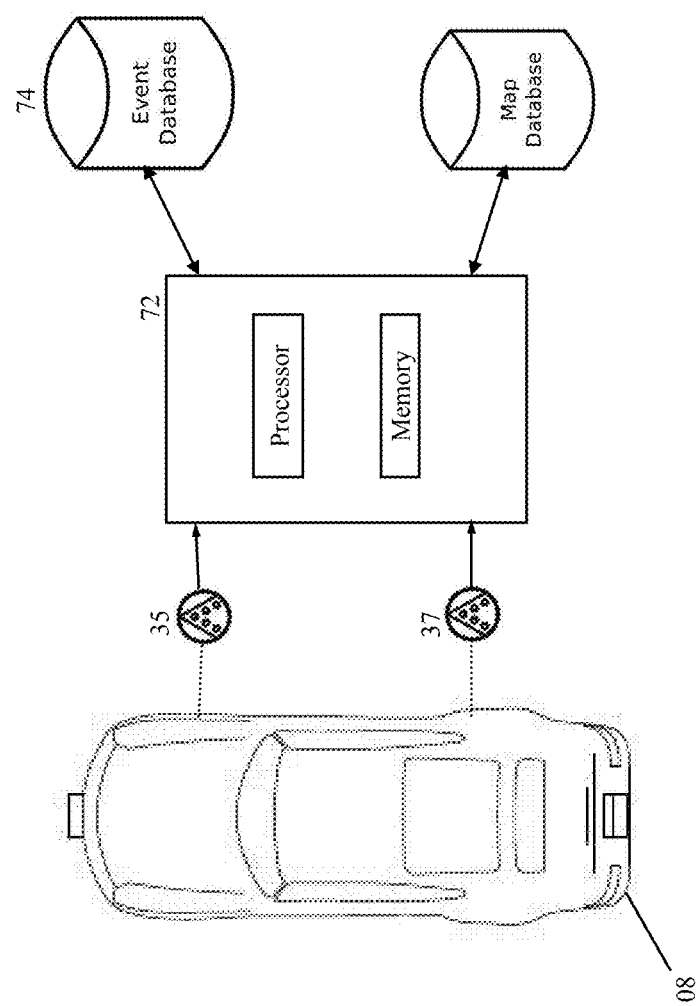
FIG. 10 illustrates an embodiment of a system for driver behavior monitoring.
Figure 11:
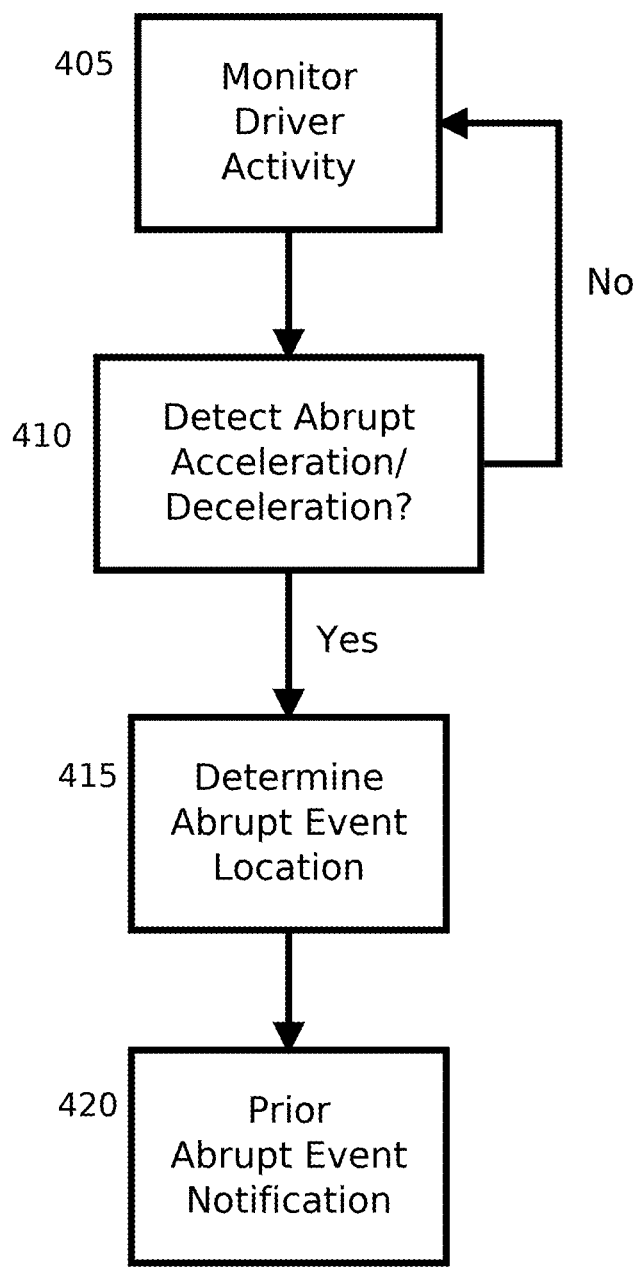
FIG. 11 illustrates an embodiment of a process of driver behavior monitoring.

Now referring to FIG. 10, alternate embodiments of systems and processes for monitoring driver behavior are disclosed, specifically systems and processes for monitoring abrupt deceleration or acceleration. A vehicle 08 having an associated computer 72 is monitored for abrupt deceleration or acceleration. Certain embodiments of the vehicle monitoring system include a computer 72, sensors 35 37, and an event database 74. An exemplary process for monitoring abrupt deceleration or acceleration is depicted in FIG. 11. The acceleration/deceleration activity of the vehicle is monitored 405. Using the acceleration/deceleration activity as input, the system monitors for an abrupt acceleration/deceleration event 410. Upon an abrupt acceleration/deceleration event, the abrupt event location is determined 415. Notifications of prior abrupt acceleration/deceleration events are provided 420. More consideration of each of the steps will be considered below.

Exemplary processes of the embodiments are on computers or microelectronics. For instance, the computer 72 may be implemented using one or more personal computers (PCs), servers, mobile devices (e.g., a smartphone), tablet devices, and/or any other appropriate devices. The various devices may work alone or in conjunction (e.g., some components of the computer system may be provided by a mobile device while other components are provided by a server). Certain processes and modules described above may be implemented as software processes that are specified as at least one set of instructions recorded on a non-transitory storage medium. When these instructions are executed by one or more computational element(s) (e.g., microprocessors, microcontrollers, application-specific integrated circuits (ASIC), field programmable gate arrays (FPGA), etc.) the instructions cause the computational element(s) to perform actions specified in the instructions.

At step 405, vehicle 08 activity is monitored, specifically acceleration/deceleration activity of a driver is monitored 405. Acceleration or deceleration activity occurs during driving activity such as increasing speed, braking, turning, or shifting gears. A sensor module 76 operable to receive data from one or more sensors receives input from sensors in order to directly or indirectly detect and measure instantaneous acceleration or deceleration or velocity. Various sensors 35 37 may be used to determine the various driving activities indicating acceleration and deceleration. Sensor 35 37 input is received. In certain configurations, sensors 35 37 are affixed directly to the vehicle 08. In certain configurations, sensors 35 37 are effectively paired with the driver of the vehicle 08, such as the driver carrying a portable computer 72.

Representative sensors may include inertial sensors 35 (e.g. accelerometers, gyroscopes, and the like), wheel speed sensors, differential speed sensors, global navigation satellite systems such as GPS 37, and/or any other appropriate sensors. The sensors may provide information related to the vehicle, such as speed, odometer readings, rotations per minute, pedal position (e.g., gas or brake), gear position, or other direct or indirect measures of location or velocity.

The sensors may be adapted to communicate with the sensor module 76 in various appropriate ways such as a local bus, a controller area network bus, wireless communication links, on board diagnostics (OBD) ports, third party software modules, or other suitable communication systems. For example, the sensors may be included in the vehicle 08 and communicated over the OBD port. Alternatively, the sensors may be included in a smartphone 72 and communicated locally. In yet another example, the sensors may be included in a retrofit system for the vehicle 08 and communicated wirelessly.

In certain configurations, the sensor module 76 provides output in the form of raw sensor values. In certain configurations, the sensor module 76 provides output in the form of the received sensor data converted into speed, inertia, location, or other values for later processing. In certain configurations, the sensor module 76 provides output in the form of a curve, the curve representing values over time.

Using the input of acceleration and deceleration activity, the vehicle monitoring system monitors for an abrupt deceleration event 410. A stop detection module 78 is adapted to process sensor module 76 data and detect an abrupt acceleration or deceleration event. The stop detection module 78 receives and processes the sensor data from the sensor module 76 in order to determine an abrupt acceleration or deceleration event.

In certain configurations, the stop detection module 78 compares the sensor data against threshold values. The stop detection module 78 may compare a single received instantaneous acceleration or deceleration sensor data values, such as accelerometer 35 output, against threshold values. Threshold values may be defined as a threshold g value (acceleration of gravity). For example, stop detection module 78 may determine an abrupt deceleration event exists where the deceleration is greater than 0.4 g. In other configurations, the stop detection module 78 may determine an abrupt deceleration event exists where the deceleration is greater than 0.75 g, 1.0 g, or other suitable values. The stop detection module 78 may compare plural received acceleration or deceleration sensor data values against an evaluation deceleration curve. Such comparison may result in identification and quantification of various differences between the evaluation curve and the subject curve. Such comparison may compare relative peaks or overlap regions of the respective curves. Suitable deceleration curves are those which indicate an undesirable deceleration, such as a certain slope or pattern.

In other configurations, the stop detection module 78 may compare velocity changes over time, such as post-processed GPS 35 output, against threshold values. Threshold values may be defined as a threshold change in speed, such as a change in miles per hour (MPH) per second. For example, the stop detection module 78 may determine an abrupt deceleration event exists where the velocity change is greater than 4 MPH/s (−4 MPH/s). In other configurations, the stop detection module 78 may determine an abrupt deceleration event exists where the deceleration is greater than 7 MPH/s, 10 MPH/s, or other suitable values. The stop detection module 78 may compare plural received velocity changes against an evaluation velocity change curve. Such comparison may result in identification and quantification of various differences between the evaluation curve and the subject curve. Such comparison may regions relative peaks or overlap regions of the respective curves. Suitable velocity change curves are those which indicate an undesirable velocity change, such as by a certain slope or pattern.

Upon an abrupt acceleration or deceleration event, the abrupt event location is determined 415. A location module 79 is operable to determine the location of the vehicle 08, commonly in the form of latitude and longitude, simultaneous with the abrupt acceleration or deceleration event. In certain configurations, the location module 79 receives position information from sensors such as the GPS 37 in order to determine the location. In certain configurations, the location module 79 receives position information from third party software modules.

The position information of the abrupt acceleration or deceleration event is stored to the event database 74. In certain configurations, a timestamp for the abrupt acceleration or deceleration event, a driver identifier, a vehicle identifier, group identifier, and other data are associated with the abrupt acceleration or deceleration event and stored in the event database 74 as an event record.

Notifications of prior abrupt stop events are provided 420. A notification module 79 is operable to notify a driver of prior abrupt acceleration or deceleration events. The notification module 79 retrieves event records from the event database 74 and generates a positional notification. One or more abrupt acceleration or deceleration event records are retrieved from the event database 74 for notifications. The retrieved events may be selected by location, driver identifier, a vehicle identifier, a group identifier, time and/or other available stored data of the event records.

The notification module 79 may provide real-time notifications to users. The notification module 79 may, for example, display information on a vehicle display, heads-up display, instrument cluster, dashboard, and/or other appropriate location. The notification module 79 may be adapted to emit sounds and/or voice alerts. The notification module 79 may be adapted to provide other warning methods such as seat and/or steering wheel vibration, colored and/or flashing lights, alphanumeric messages, graphic messages, and/or other appropriate alert methods. Such notifications may be based on various appropriate factors.

Figure 12B:
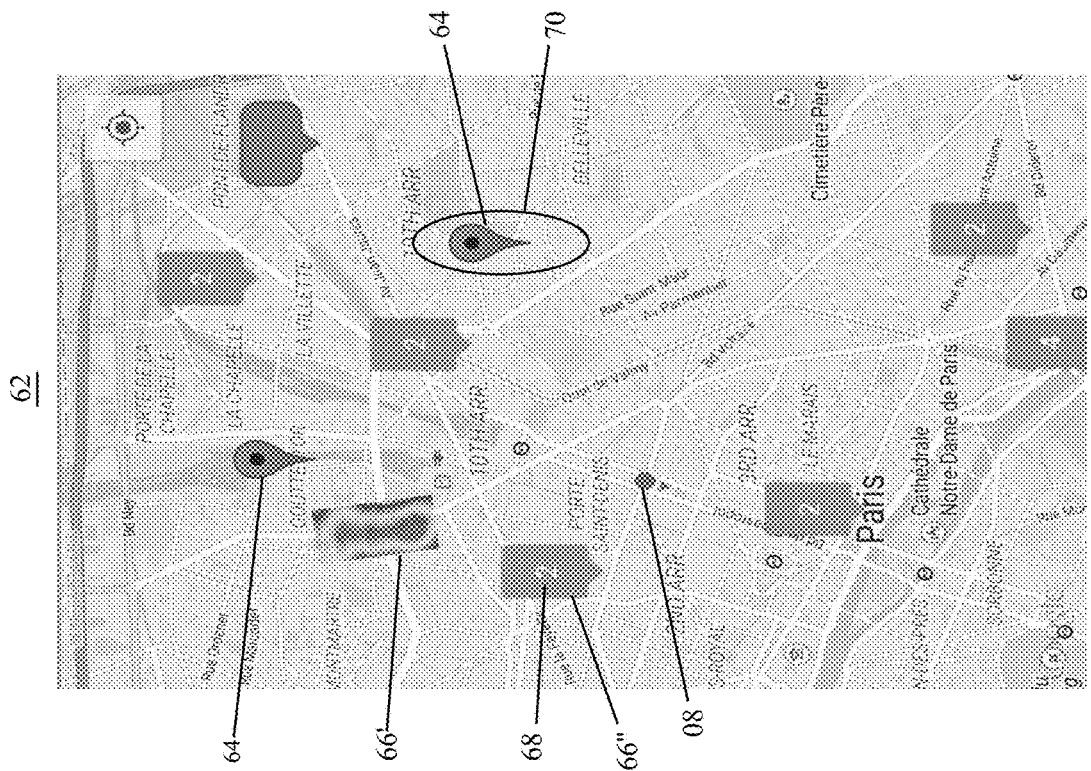
FIGS. 12A and 12B illustrate sample maps before and after driver behavior monitoring as they may exist in operation.
Figure 12A:
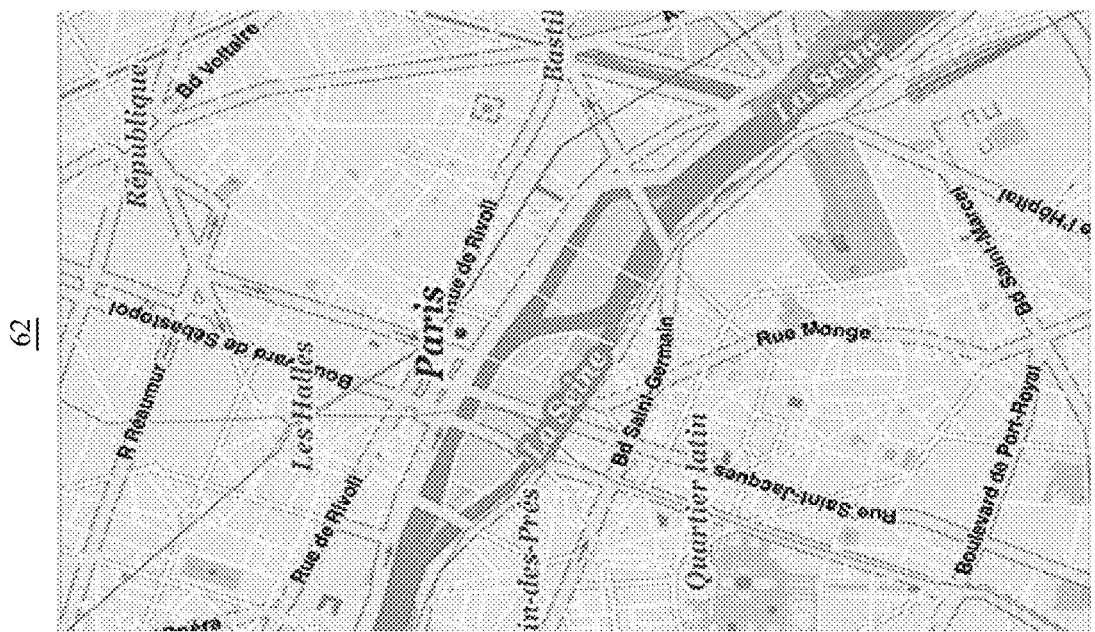

In certain configurations, the notification module 79 displays a map 62, such as that of FIG. 12A, at a certain scale or zoom level. A map database includes map data elements indicating various features associated with paths of travel for vehicles. A map database may store data related to roads and their features, and the respective locations thereof. A map database may include information such as information regarding speed limits, traffic signals and/or signage, number of travel lanes, road classes, etc. The map database may include elevation, surface type, steepness, curve radius, etc. In communication with the location module 79, the notification module 79 may receive the vehicle 08 position to match the vehicle 08 position to a position on a road segment received from the map data and correspondingly overlay the vehicle's 08 position on the map 62.

In certain configurations, the notification module 79 displays notifications 64 66 68 as overlays on a map 62 such as that of FIG. 12B. As previously disclosed, the notification module 79 retrieves one or more abrupt acceleration or deceleration event records for notification, which includes the position information for the event. In one configuration, the notification module 79 retrieves the position information for the abrupt event and overlays an indicator 64 at the corresponding position on the map 62. Where multiple retrieved events are in proximity to each other, the notification module 79 may display the plural retrieved events as a cluster 66, depending on factors such as proximity of the events, the scale or zoom level of the map, the speed of the vehicle 08, and other factors. Representative suitable cluster event displays may be in the form of a gradient 66" indicator or an indicator with an event count 68 for the cluster 66. In certain configurations, the notification module 79 generates a notification when the vehicle 08 is within a proximity region 70 of a retrieved event's location.

In example usage of a vehicle monitoring system, a user enters a vehicle 08 having a portable computer 72 with an integrated accelerometer 35 and integrated GPS 37. As the vehicle 08 travels, deceleration activity is monitored 405. The sensor module 76 receives periodic output from the accelerometer 35 and GPS 37 and processes it to determine if an abrupt deceleration event has occurred 410. If an abrupt deceleration event occurs, the location module 79 provides position information 415. The position information is stored in the event database 74. As the vehicle 08 travels, the notification module 80 retrieves selected prior abrupt events from the event database 74, retrieving the position information of the abrupt events. In communication with the location module 79, the vehicle 08 position is monitored and a map 62 is displayed in the area proximate the vehicle 08, such as the map of FIG. 12A. The maps includes indicators 64 66 of prior abrupt events overlaid at their respective position on the map 62, such as the map of FIG. 12B. Additional notifications are generated when the vehicle 08 travels within a proximity region 70 bounding a retrieved event's location.

Figure 16:
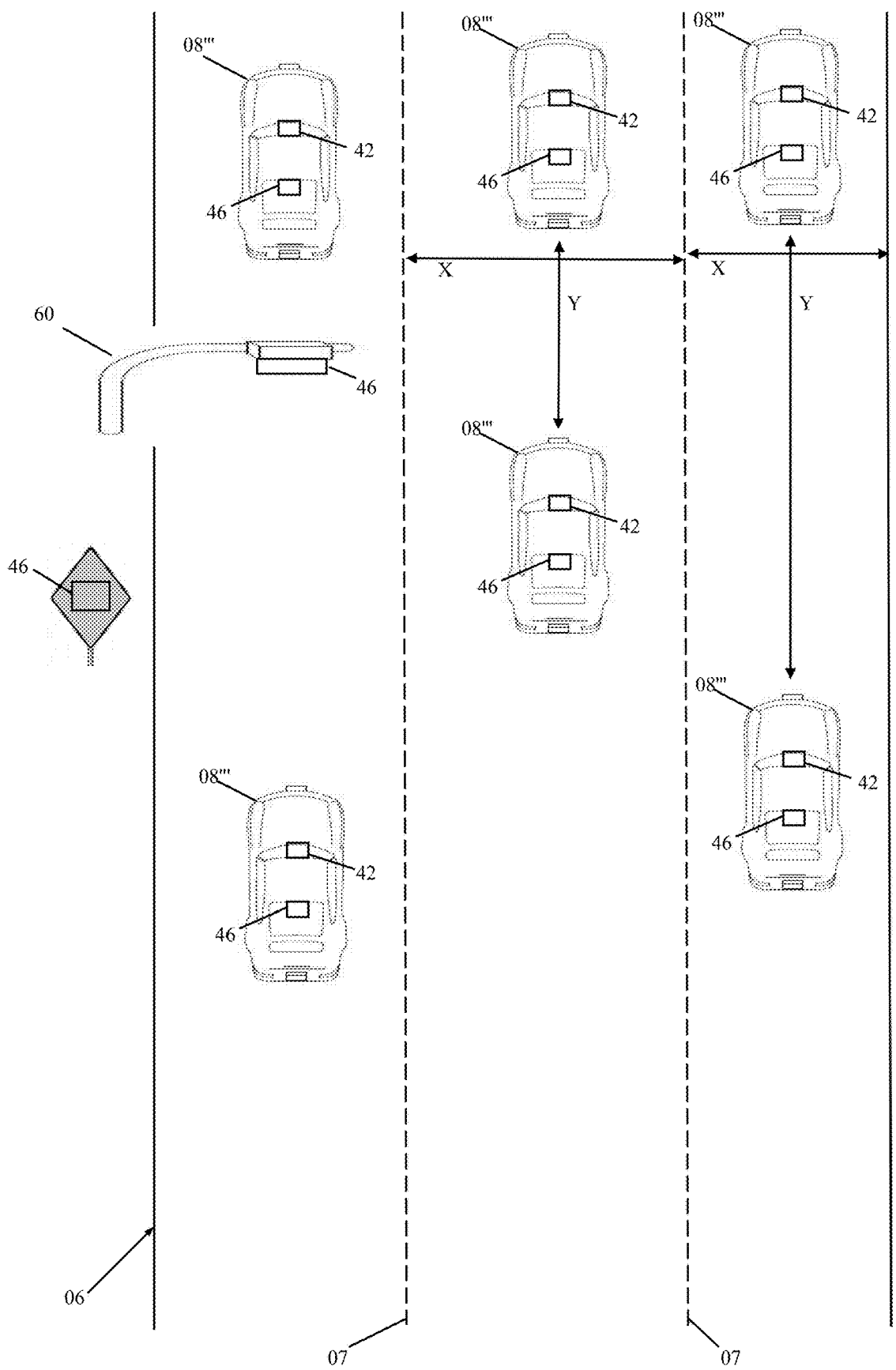
FIG. 16 illustrates a top view of embodiments of the invention as it may exist in operation.

A representative scenario is relaying a vehicle's signal condition to trailing vehicles in the same lane. FIG. 16 illustrates a plurality of vehicles 08 equipped with vehicular communication systems 10' as they may exist in operation. The vehicular communication systems 10' includes an imaging device 42 and a light display 46 for attachment to a single vehicle 08. As shown, the camera 42 and a light display 46 can be configured for different relative spatial placement on a vehicle 08. They can be housed in a single unit for attachment to the vehicle ceiling, roof, rear view mirror, or other positions. The system 10' can be configured for imaging device 42 placement toward the front of the vehicle 08. The vehicular communication systems 10' can be configured for light display 46 placement toward the rear of the vehicle 08.

Figure 13:
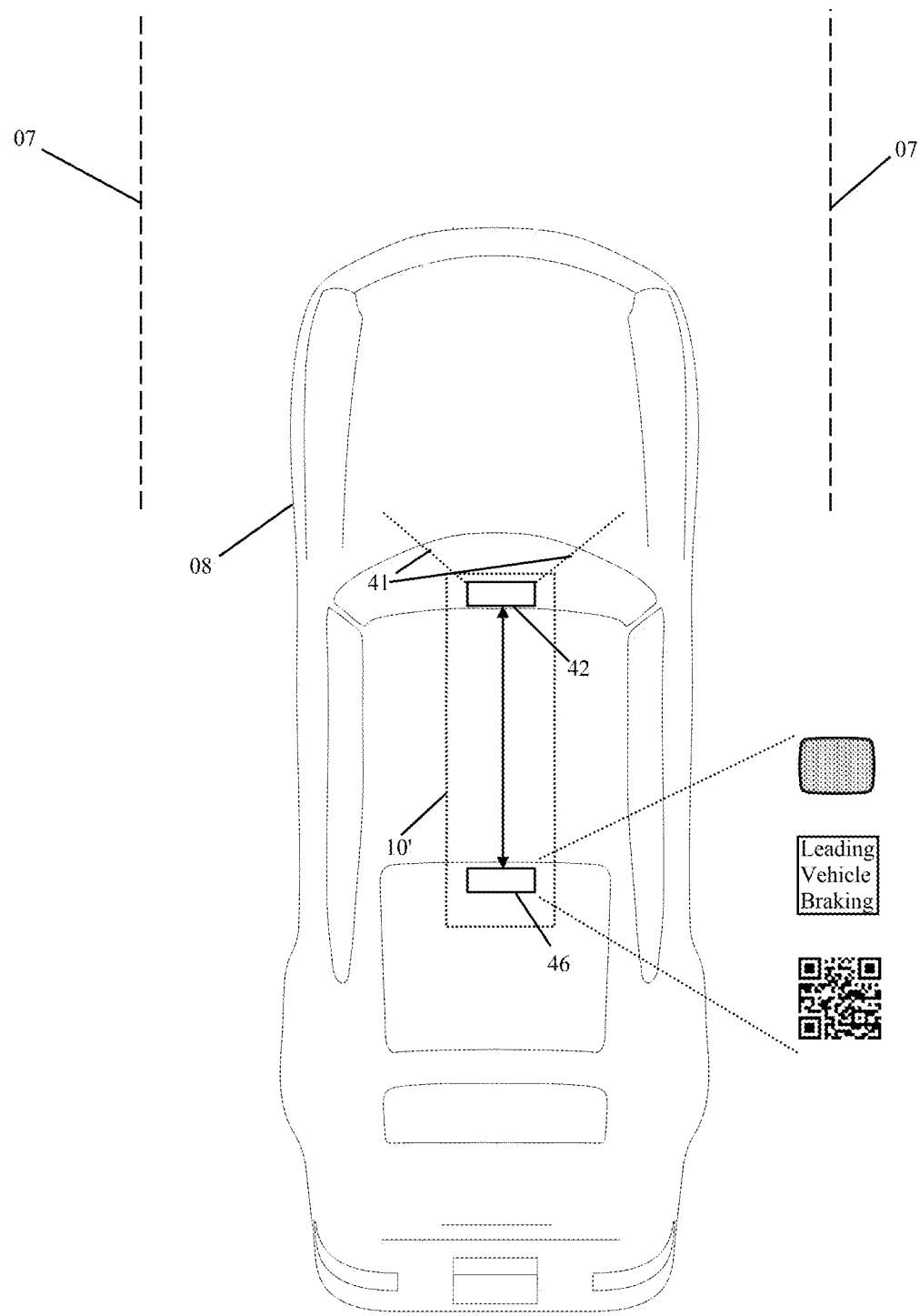
FIG. 13 illustrates a top view of an embodiment of the invention as it may exist in operation.
Figure 14:
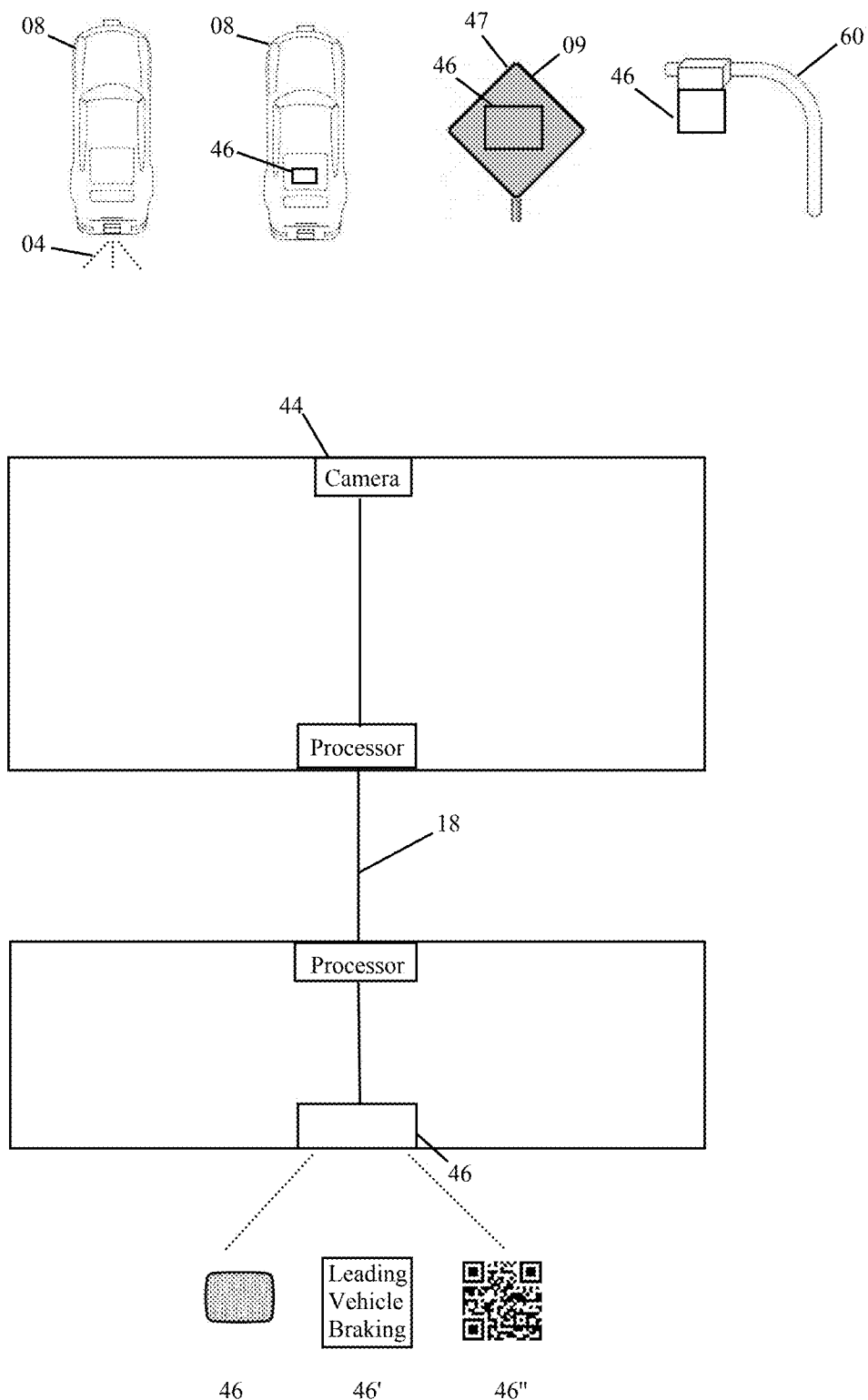
FIG. 14 illustrates a block diagram of the embodiment illustrated in FIG. 1.

FIG. 13 illustrates an embodiment of a vehicular communication systems 10' deployed to a vehicle 08. Depicted is an imaging device 42 in communication with a light display 46. FIG. 14 illustrates a block diagram of embodiments of vehicular communication systems 10'. The imaging device 42 is in communication with the light display 46 over a cable 18 or wirelessly.

A representative suitable imaging device 42 is a camera 42, which is operable to receive image data oriented to the path of travel of the vehicle 08 employing the vehicular communication system 10'. Representative suitable cameras 42 include optical cameras, color or black and white. Other suitable cameras include those integrated with a vehicle. Other suitable cameras may be integrated in other devices. For example, the camera 42 may be incorporated into a smartphone, computer connected camera, or the like. Certain configurations allow selective adjustment of the field of view 41. Field of view 41 adjustable cameras 42 can include zoom functionality, such as optically with lenses or electronically by image processing, enabling finer longitudinal field of view 41 adjustment. Other field of view 41 adjustment configurations can include a pivotal mount, enabling lateral selective adjustment of the field of view 21.

In exemplary configuration, a processor is in communication with the camera 42 in order to receive and process the image data from the camera 42. A processor is included in a computer. The processor is operable to apply computer vision to the image data of the vehicle's path of travel from the camera 42. Machine learning, such as neural networks may be employed. Some employed aspects of computer vision of the current embodiments include object detection & recognition, shape detection, blob analysis, position analysis, motion tracking, motion estimation, thresholding, optical character recognition, optical decoding (eg machine-readable optical label formats such as QR codes), and other aspects. For example, computer vision can be applied to the image data from the camera 42 to recognize vehicles, recognize lanes, track vehicles, recognize brake or other signal lights, determine distance from the camera 42, determine position within the image data, determine relative position within the image data, and other image processing.

In exemplary configuration, an imaging device 42 is in communication with a light display 46. The light display 46 is operable to activate optics in response to driving events determined from processing the images received by the camera 42. Display optics can includes those which are human recognizable or machine-readable optics. In certain configurations, the optics include a light source 46' such as a bulb, LED, light arrays, or the like. The lighting can be single or multi-color, such as an RGB LED. The light source 46' may be house or covered in a lens, such as a diffuser lens. The housing or lens may take various configurations for visual cues. Exemplary visual cues are those which are different than brake signals. Representative visual cues include selected shapes, colors, brightness, flashing sequences, unique indicia, or the like. In certain configurations, the optics include an electronic visual display. Representative suitable electronic visual display include liquid crystal displays, electroluminescent Displays, LED displays, plasma displays, quantum dot displays, electronic paper displays, and the like. Exemplary message for display on electronic visual displays includes alphanumeric messages 46' and optical machine-readable formats such as bar codes or QR codes.

In certain configurations, a light display 46 may be contained by a street sign 47 or overhead traffic tower 60 disposed above vehicles or street signs 47.

Figure 17:
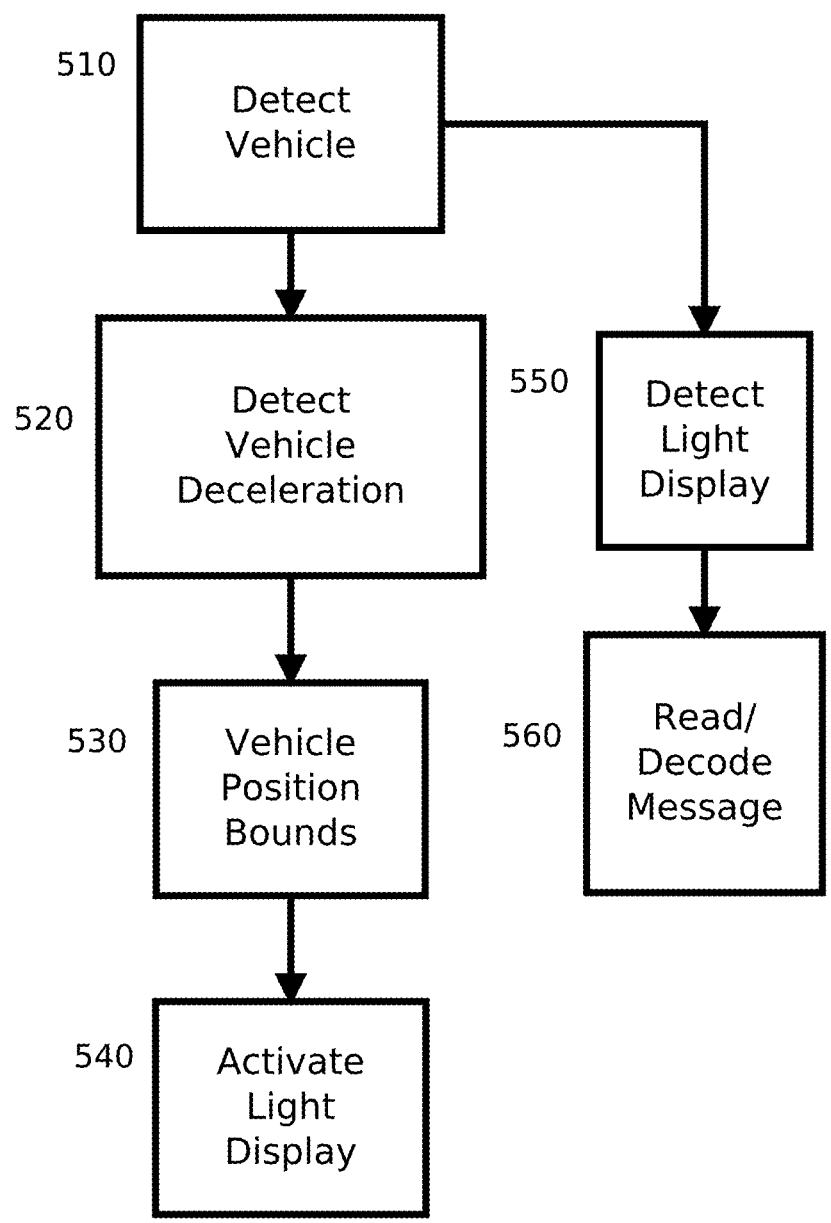
FIG. 17 illustrates an embodiment of a process of vehicular communication.

FIG. 17 depicts a process of an embodiment of a vehicular communication systems 10' in operation. FIG. 16 depicts a sample environment. A vehicular communication systems 10' is deployed to vehicle 2 before operating the vehicle. A handheld computer having a camera 42 is secured to the rear view mirror of vehicle 2 with the camera's 42 field of view 41 oriented toward vehicle 2's path of travel. The handheld computer has a processor with instructions for computer vision processing. A light display 46 is mounted at the top rear center on the interior side of the vehicle 2's rear window just below the traditional top center brake light. The vehicular communication systems 10' is activated. A driver operates vehicle 2.

At steps 510-530, the vehicular communication systems 10' monitors leading vehicles 1 for driving events, such as deceleration. At step 510, the vehicular communication systems 10' monitors for the presence leading vehicles. The camera 42 periodically receives image data of the path of travel of the vehicle for computer vision processing to detect the presence of vehicles in the path of travel of the vehicle. The processor applies image classification approaches to detect the presence of vehicles in the image data received from the camera 42. Representative object detection approaches include Viola Jones object detection, Single Shot MultiBox Detector, You Only Look Once, neural networks based, Faster RCNN, and others known in the art. One or more vehicles 08 may be detected.

At step 520, driving events for vehicles within the image data is detected. A Representative driving events include deceleration and turn intent. Representative approaches for driving event detection include color detection and object tracking. For example, to detect a deceleration event for a detected vehicle 08 based on color detection, the brake light color, normally bright red, can be detected within the region of the vehicle. For example, to detect a deceleration event for a detected vehicle 08 based on color detection, the brake light color, normally bright red, can be detected within the region of the vehicle. For example, to detect a turn intent event for a detected vehicle 08 based on color detection, the turn signal light color and/or sequence can be detected within the region of the vehicle. Representative object tracking approaches include optical flow, the Lucas-Kanade-Tomasi frameworks, and others known in the art. For instance, to detect a deceleration event for a detected vehicle 08 based on object tracking, the relative, increasing size of the vehicle can be employed as a basis. For instance, to detect a turn intent event for a detected vehicle 08 based on object tracking, lateral movement across image frames for a vehicle can be employed to detect a turn event.

At step 530, relative position of the detected vehicle is determined so that lateral (X) and longitudinal (Y) bounds may be checked. It may be desirable that activation of the light display 46 only occur when a leading vehicle 1 is in the same lane 07 of travel as the vehicle 2 and proximate the vehicle 2. In certain configurations, the processor checks that the vehicle 1 is within a target lateral (X) range. For example, in certain configurations, the processor may detect the lane 07 markings and compare the position of the lanes 07 to the position of the detected vehicle to determine that the vehicle is within a target lateral (X) bound. In certain configurations, the processor may employ an offset from the X center of the image to determine that the vehicle is within a target lateral (X) bound. In certain configurations, the processor checks that the vehicle 1 is within a target longitudinal (Y) distance range. In certain configurations, the processor may employ an offset from the Y base of the image to determine that the vehicle is within a target longitudinal (Y) bound.

At step 540, the light display 46 is activated. Upon an instruction from the processor, the light display 46 is activated. For example, from image input from the camera 42, the processor may determine that a leading vehicle is decelerating, is within the same lane of travel, and a proximate distance, and then issue an activation instruction to the light display 46. Where the light display 46 is a light source such as a bulb, LED, or light array, the lighting is activated. Where the light display 46 is an electronic visual display, a message or graphic to be displayed is prepared. In common configuration, the message corresponds to the driving event. A representative message might be an icon corresponding to the driving event, an alphanumeric message 46" corresponding to the driving event, or encoded into a machine-readable optical message 46''' corresponding to the driving event. The message is then displayed on the electronic visual display.

In certain configurations, a light display 46 is secured to a street sign 47 or overhead traffic tower 60 disposed above vehicles 08 where it may be detected 550 and read or decoded 560.

Figure 15A:
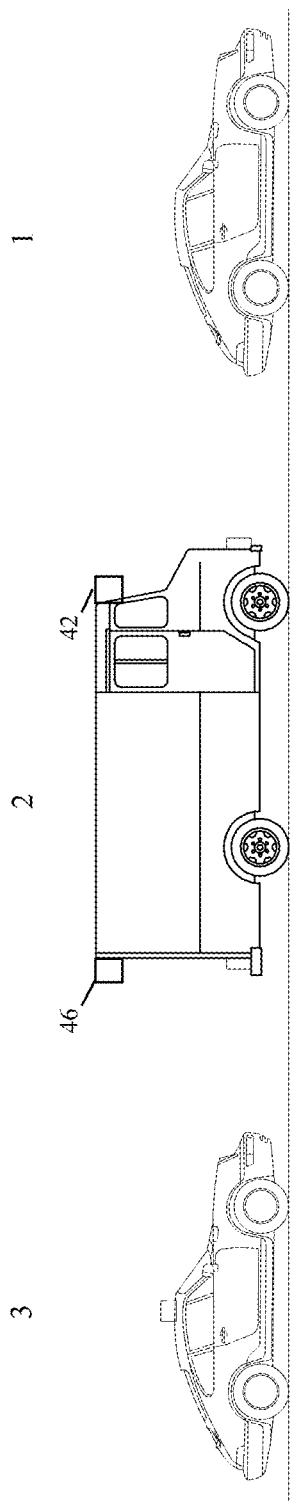
FIGS. 15A-15C illustrate side views of embodiments of the system as they may exist in operation.
Figure 15B:
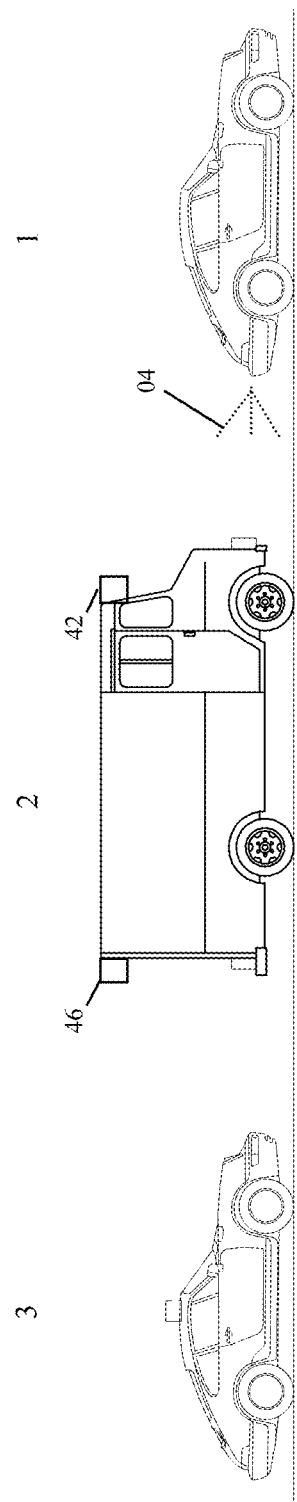
Figure 15C:
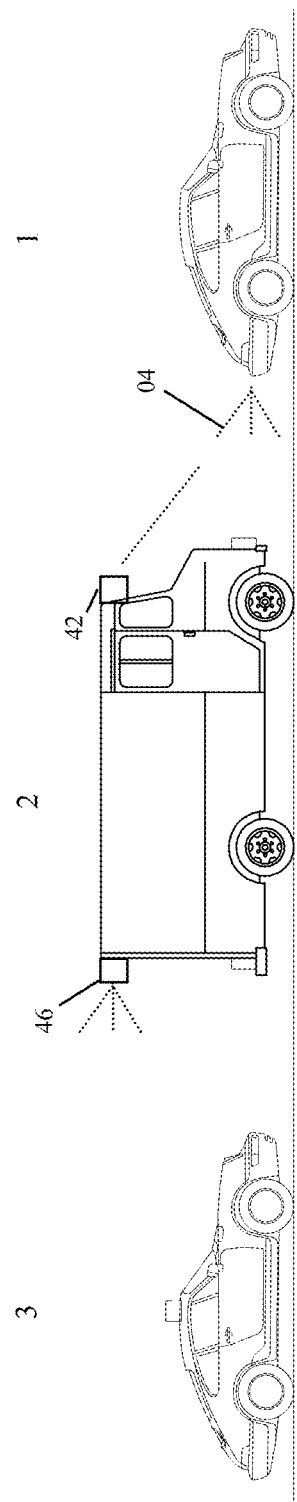

Having described elements of embodiments of vehicular communication systems 10', representative usage is disclosed with reference to FIGS. 15A-15C, FIG. 16, and FIG. 17. A leading vehicle 1, a first trailing vehicle 2, and a second trailing vehicle 3, driving in a lane in sequence and vehicle 2 equipped with a vehicular communication systems 10' (FIG. 15A). Leading vehicle 1 applies it brakes and its brakes signal 04 is activated. The camera 42 of vehicle 2 captures the activity and the processor, applying computer vision, detects the vehicle and the red brake light, determining a deceleration event. It applies a longitudinal threshold position checking and determines that vehicle 1 is within proximate distance. It sends an instruction to the light display 46 to activate, where the driver of vehicle 3 see it and acts accordingly.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A system for vehicular communication, said system comprising:
   a forward facing imaging device, processor, and an exterior facing light display adapted for attachment to a vehicle;
   said processor receiving image data from said imaging device, applying computer vision to said image data to detect the presence of a leading decelerating vehicle;
   said processor in communication with said light display, said processor signaling said light display in response to detection of a leading decelerating vehicle, said light display activating in response to said signal from said processor, wherein said light display activation is visible to a trailing vehicle, whereby said trailing vehicle is alerted to the presence of a leading decelerating vehicle to said vehicle bearing said system for vehicular communication.

2. The system of claim 1, wherein the detection of a decelerating vehicle comprises color detection of a brake light within a region of a vehicle.

3. The system of claim 1, wherein the detection of a decelerating vehicle comprises object tracking of said decelerating vehicle for relative position changes or relative size changes.

4. The system of claim 1, wherein the detection of a decelerating vehicle further comprises detecting whether said decelerating vehicle is within a target lateral bound.

5. The system of claim 4, wherein said target lateral bound detection comprises detecting lane markings and comparing the position of said lane markings to the position of the detected decelerating vehicle to determine that said decelerating vehicle is within said target lateral bound.

6. The system of claim 4, wherein said target lateral bound detection comprises determining offsets from a center position of said image data and comparing the position of said offsets to the position of the detected decelerating vehicle in order to determine that said detected decelerating vehicle is within said target lateral bound.

7. The system of claim 1, wherein the detection of a decelerating vehicle further comprises detecting whether said decelerating vehicle is within a target longitudinal bound.

8. The system of claim 7, wherein said target longitudinal bound detection comprises determining an offset from a base position of said image data and comparing the position of said offset to the position of the detected decelerating vehicle in order to determine that said decelerating vehicle is within said target longitudinal bound.

9. The system of claim 1, wherein said light display displays a visual cue selected from: a shape, a color, and a flashing sequence.

10. The system of claim 1, wherein said light display comprises an electronic visual display.

11. The system of claim 10, wherein said light display is configured to display alphanumeric messages in response to instructions from said processor.

12. The system of claim 10, wherein said light display is configured to display optical machine-readable formats in response to instructions from said processor.

13. The system of claim 12, wherein said optical machine-readable formats comprises a QR code, and said QR code encodes data corresponding to a driving event.

14. A process for vehicular communication, said process comprising:
   providing a forward facing imaging device, processor, and an exterior facing light display adapted for attachment to a vehicle;
   mounting said imaging device to a vehicle and orienting said imaging device to said vehicle's path of travel;
   said processor receiving image data from said imaging device, applying computer vision to said image data to detect the presence of a leading decelerating vehicle; and
   said processor in communication with said light display, said processor signaling said light display in response to detection of a leading decelerating vehicle, said light display activating in response to detection of a decelerating vehicle, wherein said light display activation is visible to a trailing vehicle, whereby said trailing vehicle is alerted to the presence of a leading decelerating vehicle to said vehicle bearing said system for vehicular communication.

15. The process of claim 14, wherein the detection of a decelerating vehicle comprises color detection of a brake light within a region of a vehicle.

16. The process of claim 15, wherein the detection of a decelerating vehicle further comprises detecting whether said decelerating vehicle is within a target lateral bound; and the detection of a decelerating vehicle further comprises detecting whether said decelerating vehicle is within a target longitudinal bound.

17. The process of claim 16, wherein said target lateral bound detection comprises detecting lane markings and comparing the position of said lane markings to the position of the detected decelerating vehicle to determine that said decelerating vehicle is within said target lateral bound; and
    wherein said target longitudinal bound detection comprises determining an offset from a base position of said image data and comparing the position of said offset to the position of the detected decelerating vehicle in order to determine that said decelerating vehicle is within said target longitudinal bound.

18. The process of claim 14, wherein the detection of a decelerating vehicle comprises object tracking of said decelerating vehicle for relative position changes or relative size changes.

19. The process of claim 18, wherein the detection of a decelerating vehicle further comprises detecting whether said decelerating vehicle is within a target lateral bound; and the detection of a decelerating vehicle further comprises detecting whether said decelerating vehicle is within a target longitudinal bound.

20. The process of claim 19, wherein said target lateral bound detection comprises detecting lane markings and comparing the position of said lane markings to the position of the detected decelerating vehicle to determine that said decelerating vehicle is within said target lateral bound; and
    wherein said target longitudinal bound detection comprises determining an offset from a base position of said image data and comparing the position of said offset to the position of the detected decelerating vehicle in order to determine that said decelerating vehicle is within said target longitudinal bound.

\* \* \* \* \*